Figure 1:
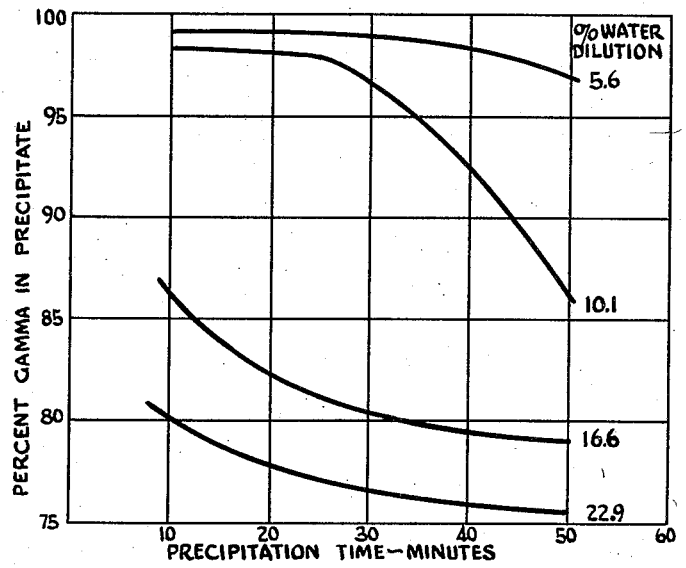

2,812,368
TREATMENT OF BENZENE HEXACHLORIDE

Max H. Gruber, Zurich, and Jean A. Filliettaz, Dielsdorf, Switzerland, assignors to Dr. R. Maag A.-G., Chemische Fabrik Dielsdorf, Dielsdorf, Switzerland, a corporation of Switzerland Application October 7, 1953, Serial No. 384,572

7 Claims. (Cl. 260—648)

The present invention relates to an improved process for preparing benzene hexachloride compositions containing enhanced concentrations of the gamma isomer thereof. In particular, it pertains to an improved method for selectively separating the gamma isomer of benzene hexachloride from the other isomers, notably those isomers prepared by addition chlorination of benzene.

Typically, benzene hexachloride is prepared according to the literature by additive chlorination of benzene with elemental chlorine in the absence of catalysts which promote substitution chlorination, such as aluminum or ferric chloride. The presence of suitable promoters for the additive chlorination, notably actinic irradiation, is usually required. Products prepared according to such processes contain at least five isomers of benzene hexachloride, such iomers being designated as alpha, beta, gamma, delta, and epsilon isomers. In such benzene hexachloride products, the gamma isomer comprises only a small portion of the total isomer contents. For example, gamma isomer concentrations of from about 12 to 16% by weight of the benzene hexachloride usually result when the processes described in the literature are performed. Sometimes products containing as low as 7%, or even less, of the gamma isomer result.

Of these five isomers, only the gamma isomer is reputed to possess sufficient toxicity towards insecticides such that it may be employed as a commercial insecticide. Thus, the major portion of the additive chlorination product, e. g. some 84 to 88% of the total product, is of little or no value as an insecticide. For obvious reasons, it is therefore often advantageous to provide benzene hexachloride compositions which have a higher gamma isomer concentration than normally present in the reaction product.

According to the instant invention, an improved process has been provided whereby the gamma isomer may be selectively separated from one or more of the other known isomers such that products may be provided which contain gamma isomer concentrations far in excess of those obtained by the reactions employed to prepare benzene hexachloride. Performance of this invention makes it possible to prepare compositions containing as high as 95 to 100 percent isomer contents. Moreover, this selective separation may be effected with a minimum loss of the gamma isomer, a problem which has limited the utility of other suggested processes.

It has, of course, been possible to prepare pure gamma isomer by separation from a mixture of benzene hexachloride isomers. However, the processes described in the literature, either are purely academic in character requiring numerous steps or are inefficient as far as the relative amount of gamma isomer which may be recovered in the separated product. Conversely, the instant process of this invention obviates each of these criticisms by providing a relatively simple and efficient method for separating the gamma isomer.

According to this invention, it has been discovered that the gamma isomer may be easily and efficiently selectively separated from an isomeric mixture of various benzene hexachlorides by establishing an alcoholic solution of the mixture and thereafter diluting the solution with water under controlled conditions whereby a gamma enriched precipitate forms. In this process, it has been found that the degree of water dilution, e. g. the amount of water added with respect to the amount of solution involved, and the rapidity with which the precipitate is removed from the aqueous medium after it has been formed, e. g. the precipitation time, both independently and interdependently influence the preparation of a suitable product under commercially advantageous conditions.

It appears that when water is added to an alcoholic solution of an isomeric mixture of benzene hexachlorides an unusual system is established, which although apparently at equilibrium, is nevertheless in a metastable condition. In any event, notwithstanding the scientific explanation for the stability of the system, unless the precipitate is removed within a limited period of time from the instant in which the water has been added to the alcoholic solution undesirable decreases in the gamma content of the precipitate are observed. If, for example, the gamma contents of the precipitates are ascertained at varying intervals from the time the precipitate first commences to form, the products which precipitate from the aqueous medium after the expiration of the first 25 minutes contain a substantially lower concentration of gamma isomer than those products which are formed by precipitation within the first 25 minutes. This phenomonon is particularly apparent when the amount of water added is such that aqueous alcoholic solutions containing from about 5 to 25 percent water, based on the weight of the alcohol and water, are employed. However, it also may be observed when the degree of water dilution is below such concentrations. Thus, to some extent the precipitation time and degree of water dilution are inter-related; this will be explained more fully hereinafter.

Performance of this invention therefore involves establishing an alcoholic solution of an isomeric mixture of benzene hexachloride, such as by dissolving the benzene hexachloride prepared by addition chlorination of benzene in methanol, diluting such an alcoholic solution with water such as by adding water thereto, and separating the resulting precipitate within about 25 minutes from the time the water dilution has been effected. Such separation may be achieved by filtration, centrifugation, decantation, or similar equivalent operation. In a preferred embodiment, the degree of water dilution is controlled such that the solution from which the gamma isomer is precipitated contains from about 5 to 25 percent by weight of water (based on the water and alcohol present).

The particular precipitation time which is employed is governed to some extent by the yield of gamma isomer that is desired. The longer the precipitation time is up to a maximum of 25 minutes, the larger will be the total amount of gamma isomer present in the precipitate (based on the amount of gamma isomer initially dissolved). For example, in one particular series of operations conducted under identical conditions except that the precipitation time was varied, the amount of gamma isomer appearing in the precipitate based on the total amount dissolved was 61% for a precipitation time of 10 minutes, whereas a precipitation time of 25 minutes provided a precipitate which contained 69% of the gamma isomer. For longer precipitation periods, that is over 25 minutes, no apparent increases in this yield are usually possible. Only decreasing gamma isomer concentrations in the precipitate are observed when the precipitation period exceeds about 25 minutes.

Another feature of this invention involves controlling the degree of water dilution of the alcoholic solution of benzene hexachloride isomers in order to operate at the most advantageous condition. Thus, if the objective is to obtain a precipitate which has the highest possible gamma isomer concentration, a minimum amount of water should be added; as a practical matter, adding sufficient water to provide a 5 percent by weight water dilution of the alcoholic solution, represents such a minimum although of course even less water dilution is actually possible. However, at these low water dilutions, the total amount of gamma isomer present in the precipitate as compared with the total amount initially in the alcoholic solution is on the order of only 20 to 30 percent.

On the other hand, the alcoholic solution may be diluted to a higher degree, such as to establish a water content of about 25 to 30 percent in the aqueous alcoholic medium. This provides gamma isomer recoveries (based on the total amount of gamma isomer initially in the alcoholic solution) of from about 70 to 80 percent, while providing precipitates which contains 76 to 83 percent by weight of the gamma isomer. It therefore will be seen that extremely pure gamma isomer may be obtained as a precipitate if relatively low overall gamma isomer recovery is satisfactory. Considerably larger recoveries of the gamma isomer in the precipitate may be achieved if precipitates containing between about 75 and 85 percent by weight of the gamma isomer are prepared, as by diluting the initial alcoholic solution with between about 20 and 30 percent by weight of water.

Figure 2:
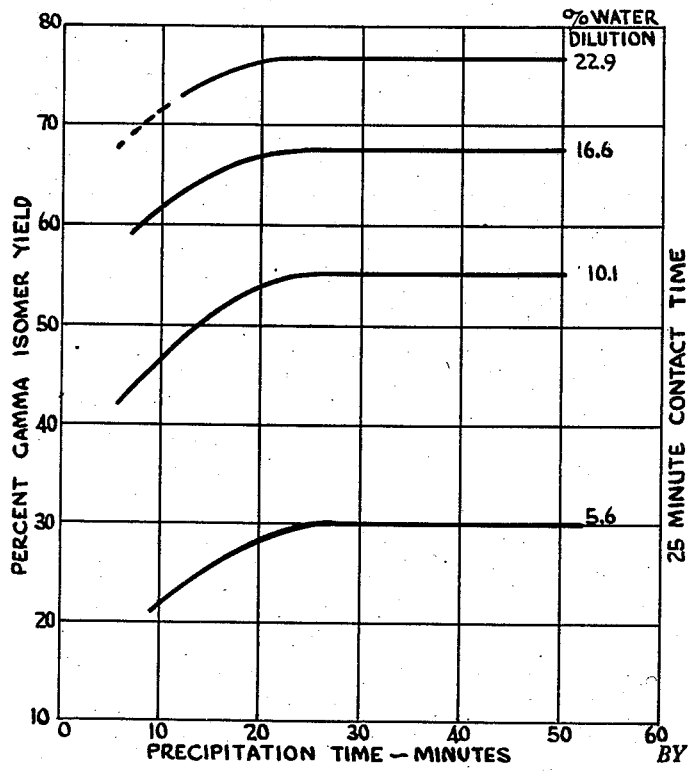

Besides exerting an independent effect on the quality and quantity of the precipitate, the precipitation time and degree of water dilution also are interdependent, and should be used co-operatively in order to achieve optimum conditions. The degree of water dilution selected for use in a given operation defines the maximum yield and maximum gamma isomer concentration capable of being provided in the precipitate. Whether such maximums are achieved, however, depends on the particular precipitation time below 25 minutes which is selected. If a precipitation period of 25 minutes is employed, a maximum gamma isomer yield will be obtained, but at the expense of somewhat diminished gamma isomer concentrations in the precipitated product. Employing a shorter precipitation, on the other hand, will permit attainment of maximum gamma isomer concentrations in the precipitate for the specified degree of water dilution, although somewhat reduced yields are the result. Reference to Figures 1 and 2 of the accompanying drawings which graphically depict experimental data will emphasize these points.

Figure 1 in the drawings pictorially emphasizes that although all degrees of water dilution, in a limited sense, are within the contemplation of this invention, more ideally, water dilutions from between about 5 and 30 percent by weight represent practical conditions. Within such range, however, control of the precipitation period is most critical at water dilution from about 8 to 15 percent. If reference is had to the curve representing approximately 10.1 percent water dilution in Figure 1, it will be seen that when the precipitation period exceeds 25 minutes a sharp decline in the gamma concentration of the precipitate is encountered. A preferred range of operating conditions is accordingly one in which the water dilution is between about 8 and 15 percent.

Frequently under commercial conditions (those in which suitable yields are necessary due to economic considerations) it is not advisable to prepare essentially pure gamma isomer directly as a precipitate in this process, but instead a product having a gamma content of 60–85 percent is prepared. This may make it desirable to further purify at least a portion of the precipitate in order to prepare lindane (99+ percent by weight gamma isomer). Simple recrystallization of the precipitate from an alcohol such as methanol or ethanol is suitable. Almost any precipitate which contains above about 65 to 75 percent by weight of the gamma isomer may be further purified to lindane by a single step recrystallization.

Alcoholic solutions of isomeric mixtures of benzene hexachlorides are prepared by dissolving the mixture in a lower aliphatic alcohol, notably methanol or ethanol. Usually, enough alcohol is employed to dissolve at least essentially all of the solid isomeric mixture, e. g. at least about 90 percent by weight of the mixture should normally be placed in solution. If less of the mixture is dissolved, the process will not be as efficient, although operable.

The exact quantity of alcohol necessary to dissolve the requisite percentage of solids varies, depending on the specific alcohol, the temperature at which the solution is prepared and the isomer distribution in the mixture. At higher temperatures, for example the isomers are more soluble in alcohols than at low temperatures. This temperature effect will be noticed even within the preferred range of operation, e. g. between 5° C. and 40° C.

Notwithstanding these variables, suitable solutions are readily prepared by visual observation. That is, adequate alcohol is added to an isomeric mixture such that at equilibrium no appreciable solid phase can be observed. Regardless of the specific conditions, it is therefore no problem to achieve the desired alcoholic solution. Also, solubility data may be employed in lieu of observations.

While this invention contemplates employing sufficient alcohol to dissolve at least 90 percent by weight of the isomeric mixture being treated and to provide a saturated solution, it is to be recognized that even larger quantities of the alcohol may be employed. Under certain circumstances, such as to avoid premature precipitation prior to the addition of water due to various temperature fluctuations that may be encountered in commercial systems, it may be desirable to employ an excess of the alcohol. Excesses of the alcohol up to about 100 percent by weight (e. g. such that a solution which is only about 50 percent saturated) may be employed without encountering undue complications. Even larger excesses of the alcohol are operable, but the problem of handling large volumes of liquid frequently mitigates against employing more than 100 percent by weight of excess alcohol. In the event excesses are used, some variation from the data herein presented may be expected for any specific degree of water dilution. The same general series of curves shown in Figures 1 and 2 of the drawings, however, apply except that whereas at 20 percent excess of alcohol a water dilution of between 5 to 30 percent and preferably 8 to 15 percent, is necessary, somewhat higher water dilutions would be required to reproduce equivalent data.

Alcohols which may be used to provide the solutions are those which are capable of dissolving the various contemplated isomeric mixtures of benzene hexachloride and which are water soluble, or at least completely miscible with water within the range of contemplated water dilutions. Among those which satisfy these requirements are the lower aliphatic alcohols containing from 1 to 4 carbon atoms inclusive, such as methanol, ethanol, iso-propanol, n-propanol, n-butanol, and iso-butanol.

When sufficient quantities of these alcohols are used to dissolve between 90 and 100 percent of the isomeric mixture of benzene hexachloride solids, it is necessary to remove whatever remaining solid phase may be present prior to the addition of water in order to obtain a satisfactory product conforming to the optimum possible yield and precipitate quality. Thus, if only about 90 percent of the solid benzene hexachlorides are dissolved in the alcohol, the remaining solid phase is usually separated as by filtration, centrifugation, decantation, or similar operation. Operation at below optimum conditions of course will permit the omission of such separation; if the weight of this solid phase remaining behind is not great in proportion to the weight of the contemplated precipitate, operation at near optimum efficiency is also possible without performing the separation.

This invention contemplates treatment of an alcoholic solution containing any mixture of the gamma isomer and at least one other isomer of benzene hexachloride particularly the alpha and/or the delta isomers.

As a practical matter, those isomeric mixtures commonly encountered in commercial processes are those which may normally be expected to be employed. Thus, the various isomeric mixtures of benzene hexachloride which are provided by direct addition chlorination of benzene are included. Further, isomeric mixtures such as those resulting from the process described in U. S. Letters Patent No. 2,569,677 granted October 2, 1951, likewise are included. Such isomeric mixtures are usually substantially richer in the gamma isomer than the direct additive chlorination products since a substantial amount of the alpha isomer has been removed as part of the solid phase. Other isomeric mixtures containing the gamma isomer or at least one isomer, particularly the alpha and/or delta isomer, are also useful. Isomer mixtures containing up to 60 percent gamma isomer are preferably employed.

After the alcoholic solution has been prepared in accordance with the contemplated expedient, the precipitation of a gamma enriched product is achieved by adding water thereto. On a small scale, or in a batch process, this may simply involve adding water to the solution, and then separating the precipitate within the given precipitation time range. This type of operation is necessarily restricted to a very limited scale of operation since the time delays involved in completing the water dilution and effecting the separating of precipitate may be sufficiently large as to make accurate control over the time periods almost impossible. This is of significance when more exact conditions are desired, particularly when reproducibility of a given product is called for.

According to a further embodiment of this invention, it is desirable to operate the precipitation step by establishing a moving body of the alcoholic solution and adding water to that body at a point along its line of flow. For example, the alcoholic solution may be continually introduced into a zone of limited volume capacity and continually removed therefrom such that within the zone there is established a pool of the alcoholic solution which is of relatively small volume in comparison with the total amount of alcoholic solution being processed. Water may then be continually added to the zone at a rate which is correlated with the rate at which the alcoholic solution is passed through the zone so as to establish an adequate degree of water dilution in accordance with this invention. If the volume within the zone is sufficiently small, as is contemplated by this invention, such that there is essentially no unduly long hold up of the alcoholic material within the zone, it is possible to filter the body emanating from the zone at any point along its line of flow. This permits one to select a specific precipitation period. After removing the precipitate, any residual alcohol that may be entrapped in the solid is removed by washing or simple heating to volatilize off the liquid. The filtrate, or remaining aqueous alcoholic solution of benzene hexachloride isomers, depending on the particular conditions of operation will contain varying amounts of the soluble gamma isomer, and reused in further operations, e. g. may be recycled in a continuous process and added to the feed of isomers to the system. Alternatively, the isomers remaining in the aqueous alcoholic solution may be directly recovered by removing the solvent and water, such as by azeotropic distillation, and used as is befitting their composition. If for example, there is still sufficient gamma isomer to make the product salable, it may be marked directly.

The following example demonstrates the manner in which this invention may be practiced, but is not intended to impose any limitations thereupon:

EXAMPLE I

One hundred pounds of an isomeric mixture of benzene hexachloride were added to 374 pounds of essentially dry methanol. The isomeric mixture had the following composition:

Alpha _____ 21.2
Beta _____ 3.0
Gamma _____ 42.5
Delta _____ 19.6
Epsilon _____ 6.2

The resulting mixture was agitated at approximately 21° C. until equilibrium had been reached and all possible benzene hexachloride had been dissolved. After approximately 3 hours, the methanolic solution was filtered to remove any solid phase thereby insuring the absence of any solid phase. Some 2½ pounds of benzene hexachloride was removed in this manner, substantially all of which was alpha isomer. Thereafter, 75 pounds of methanol was added to the solution. This solid free methanolic solution was then continuously passed through a zone of good agitation.

This zone of agitation was the suction port of a 1–CG–1 Worthington centrifugal pump with a one-half inch thick "dutchman" added to the port to provide a chamber having a volume of 2.7 cubic inches. The discharge side of the pump was throttled in order to keep the chamber filled with liquid. Individual one-fourth inch feed lines for the water and methanolic solution were employed. The pump was operated at 1750 revolutions per minute.

The rate of feeds for water and the methanol solution were correlated such that the desired degree of dilution listed in Table I, below, was achieved. Depending on the various feed rates, the hold up time in the chamber varied but was on the order of one second, plus or minus 0.5 second.

From the outlet side of the chamber, the aqueous methanolic medium was continually withdrawn and the solid phase separated in a centrifuge within the specified times listed in Table I. The separated solid was promptly recovered from the centrifuge. As used in Table I, "precipitation time" is the period of time from when water was first added to a given methanol solution in the chamber and precipitation commenced until the solid was removed by centrifugation and recovered from the centrifuge.

Any residual liquid, either methanol or water, which was present was removed by merely raising the temperature of the filtrate and evaporating all such liquids. Infra-red spectroanalysis was then employed to determine the gamma isomer content of the respective products, Table I describing the results of such analyses.

The following table lists the data obtained by following the above outlined procedure with appropriate precipitation periods and degrees of water dilution:

Table I

| Percent H₂O Dilution | 5.6 | | 10.1 | | 16.6 | | 22.9 | |
|---|---|---|---|---|---|---|---|---|
| Precipitation Time, Min. | γ, Percent | Percent Yield | γ, Percent | Percent Yield | γ, Percent | Percent Yield | γ, Percent | Percent Yield |
| 10 | 96.2 | 23.4 | 94.8 | 45.7 | 82.6 | 61.0 | 78.8 | 76.6 |
| 15 | 97.4 | 28.7 | 98.8 | ____ | 85.7 | 64.9 | 79.4 | 74.3 |
| 20 | 98.9 | 24.0 | 97.8 | 52.9 | 81.4 | ____ | ____ | ____ |
| 25 | 96.9 | 31.2 | 96.5 | 50.8 | 80.4 | 64.4 | 78.1 | 74.8 |
| 30 | 101.1 | 29.9 | 96.4 | ____ | ____ | ____ | 75.9 | 75.4 |
| 40 | 97.9 | ____ | 88.1 | 55.4 | 78.2 | 68.1 | ____ | ____ |
| 50 | 97.9 | 25.9 | 83.2 | 54.9 | 79.5 | 66.9 | 76.8 | 76.8 |

Alcohols such as ethanol, isopropanol, and n-butanol may be employed in lieu of methanol in the above example with similar results. Likewise, other mixtures of benzene hexachloride isomers may be employed in lieu of the one utilized in Example 1 above. It is possible to obtain curves such as those shown in Figures 1 and 2 of the drawings for various alcohols contemplated and various isomeric mixtures.

Although this invention has been described with reference to specific details of certain embodiments, it is not intended that it should be construed as being limited to such details except insofar as they are recited in the appended claims.

We claim:

1. A method of preparing a benzene hexachloride composition which comprises dissolving a mixture of benzene hexachloride isomers including the gamma isomer in a lower aliphatic alcohol of 1 to 4 carbon atoms to provide an alcoholic solution thereof, adding sufficient water to said alcoholic solution at 5° C. to 40° C. to provide an aqueous solution containing from 8 to 15 percent by weight of water based on the water and alcohol present whereby a portion of the dissolved isomeric mixture precipitates as a solid phase containing a gamma isomer concentration greater than that present in said dissolved mixture and separating said gamma enriched precipitate from the aqueous medium within 25 minutes of the time the water is added.

2. The method of claim 1 wherein the lower aliphatic alcohol is methanol.

3. A method of preparing a benzene hexachloride composition containing an enhanced gamma isomer content which comprises establishing a solution of the gamma isomer and at least one other isomer of benzene hexachloride in a lower aliphatic alcohol of 1 to 4 carbon atoms, diluting such solution at 5° C. to 40° C. with sufficient water to provide an aqueous alcoholic solution containing from 5 to 30 percent by weight of water based on the water and alcohol whereby to precipitate only a portion of the dissolved benzene hexachloride, said precipitate containing a higher gamma isomer concentration than said dissolved benzene hexachloride and separating the precipitate from the aqueous alcoholic medium within 25 minutes of the time it is formed.

4. The method of claim 3 wherein the alcohol is methanol.

5. The method of selectively separating gamma isomer from other isomers of benzene hexachloride which comprises establishing a moving body of a solution of an isomeric mixture of benzene hexachloride including the gamma isomer in a lower aliphatic alcohol of 1 to 4 carbon atoms, adding sufficient water to the body at 5° C. to 40° C. at a point along its line of movement to dilute the solution and provide an aqueous solution containing from 5 to 30 percent water by weight of the water and alcohol whereby only a portion of the dissolved isomeric mixture precipitates as a solid phase containing an enhanced concentration of the gamma isomer and separating the precipitate from the aqueous medium within 25 minutes of the time it has been formed.

6. A method of selectively separating gamma isomer from other isomers of benzene hexachloride which comprises establishing a zone of agitation, continually introducing a solution of benzene hexachloride isomers including the gamma isomer in a lower aliphatic alcohol of 1 to 4 carbon atoms into the zone at 5° C. to 40° C., continually adding water to the zone in an amount sufficient to establish an aqueous alcoholic solution containing from 5 to 30 percent water by weight of the alcohol and water whereby only a portion of the dissolved benzene hexachloride containing an enhanced concentration of the gamma isomer precipitates from the aqueous alcoholic medium, continually withdrawing the aqueous alcoholic medium including the precipitate from the zone and separating the precipitate from the aqueous medium within 25 minutes of the time it has been formed.

7. A method of preparing a benzene hexachloride composition containing an enhanced gamma isomer content which comprises establishing a methanolic solution of an isomeric mixture of benzene hexachlorides, said mixture containing at least the gamma and alpha isomers, wherein the ratio of the gamma isomer to alpha isomer in solution is at least 2.0 to 1, diluting such solution at 5° C. to 40° C. with sufficient water to provide an aqueous alcoholic solution containing from 5 to 30 percent by weight of water based on the water and alcohol whereby to precipitate only a portion of the dissolved benzene hexachloride, said precipitate containing a higher gamma isomer concentration than said dissolved benzene hexachloride and separating the precipitate from the aqueous alcoholic medium within 25 minutes of the time it is formed.

References Cited in the file of this patent

UNITED STATES PATENTS

| 2,438,900 | Cooke et al. | Apr. 6, 1948 |
| 2,603,664 | Burrage | July 15, 1952 |

FOREIGN PATENTS

| 586,468 | Great Britain | Mar. 19, 1947 |